US010531300B2

(12) United States Patent
Shishido et al.

(10) Patent No.: US 10,531,300 B2
(45) Date of Patent: Jan. 7, 2020

(54) TERMINAL DEVICE, MANAGEMENT DEVICE, STORAGE MEDIUM ADAPTED FOR COMMUNICATION BETWEEN MULTIPLE TERMINAL DEVICES WITHIN A GROUP

(71) Applicant: JVC KENWOOD Corporation, Yokohama-shi, Kanagawa (JP)

(72) Inventors: Ichiro Shishido, Yokohama (JP); Shunichi Manabe, Yokohama (JP); Tomoko Yaginuma, Yokohama (JP); Masae Toko, Yokohama (JP); Kazuya Tsukamoto, Yokohama (JP)

(73) Assignee: JVC KENWOOD CORPORATION, Yokohama-Shi (JP)

( * ) Notice: Subject to any disclaimer, the term of this patent is extended or adjusted under 35 U.S.C. 154(b) by 366 days.

(21) Appl. No.: 15/278,607

(22) Filed: Sep. 28, 2016

(65) Prior Publication Data
US 2017/0019791 A1    Jan. 19, 2017

Related U.S. Application Data

(63) Continuation of application No. PCT/JP2014/075896, filed on Sep. 29, 2014.

(30) Foreign Application Priority Data

Mar. 31, 2014  (JP) ................................ 2014-071221

(51) Int. Cl.
*H04W 12/08*    (2009.01)
*H04L 29/06*    (2006.01)
(Continued)

(52) U.S. Cl.
CPC ........... *H04W 12/08* (2013.01); *H04L 63/104* (2013.01); *H04W 4/08* (2013.01); *H04W 12/06* (2013.01)

(58) Field of Classification Search
CPC .................................................... H04W 12/08
(Continued)

(56) References Cited

U.S. PATENT DOCUMENTS

2005/0221851 A1* 10/2005 Grivas .................. H04W 84/08
455/518
2007/0049314 A1* 3/2007 Balachandran ......... H04W 4/10
455/518
2016/0381526 A1* 12/2016 Allen .................. H04L 65/1069
709/203

FOREIGN PATENT DOCUMENTS

JP    2005-252610 A    9/2005
JP    2007074381 A    3/2007
(Continued)

*Primary Examiner* — Chuck Huynh
(74) *Attorney, Agent, or Firm* — Brundidge & Stanger, P.C.

(57) ABSTRACT

In a business wireless system, a group including a plurality of terminal devices is formed and communication is performed by using at least one base station device to assign a channel to each group. A transmission unit uses a channel assigned by the base station device to a first group for transmission. An authentication processing unit authenticates a user using the terminal device. A selection unit selects one of a second group that only the terminal devices for which the authentication process is completed can subscribe to, and the first group, when the authentication process is completed. When the second group is selected, the transmission unit the channel assigned by the base station device to the second group for transmission.

4 Claims, 15 Drawing Sheets

(51) Int. Cl.
*H04W 4/08* (2009.01)
*H04W 12/06* (2009.01)

(58) Field of Classification Search
USPC .......................................................... 455/411
See application file for complete search history.

(56) References Cited

FOREIGN PATENT DOCUMENTS

| | | |
|---|---|---|
| JP | 2007-513592 A | 5/2007 |
| JP | 2010283769 A | 12/2010 |
| JP | 2013-236339 A | 11/2013 |

* cited by examiner

FIG. 4A

| GROUP NAME | TERMINAL DEVICE ID | AUTHENTICATION RESULT |
|---|---|---|
| 1,1' | 6700 | AUTHENTICATED |
| 1 | 1234 | UNAUTHENTICATED |
| 1,1' | 8100 | AUTHENTICATED |
| 1,1' | 5515 | AUTHENTICATED |
| ... | ... | ... |
| 2,2' | 6450 | AUTHENTICATED |
| 2 | 4321 | UNAUTHENTICATED |
| ... | ... | ... |

FIG. 4B

| GROUP NAME | TERMINAL DEVICE ID | USER NAME | AUTHENTICATION RESULT |
|---|---|---|---|
| 1,1' | 6700 | Tom | AUTHENTICATED |
| 1 | 1234 |  | UNAUTHENTICATED |
| 1,1' | 8100 | Alice | AUTHENTICATED |
| 1,1' | 5515 | Bob | AUTHENTICATED |
| ... | ... | ... | ... |
| 2,2' | 6450 | Mick | AUTHENTICATED |
| 2 | 4321 |  | UNAUTHENTICATED |
| ... | ... | ... | ... |

FIG. 6

| ID1 (24) | AUTHENTICATION RESULT OF ID1 (1) | USER ID FOR ID1 (39) |

FIG. 7

| ID1 (24) | USER NAME FOR ID1 (104) |

| GROUP NAME | TERMINAL DEVICE ID | AUTHENTICATION RESULT |
|---|---|---|
| 1 | 6700 | AUTHENTICATED |
| 1 | 1234 | UNAUTHENTICATED |
| 1' | 8100 | AUTHENTICATED |
| 1' | 5515 | AUTHENTICATED |
| ... | ... | ... |
| 2 | 6450 | AUTHENTICATED |
| 2 | 4321 | AUTHENTICATED |
| ... | ... | | ized into use (see, for example, patent document 1).
TERMINAL DEVICE, MANAGEMENT DEVICE, STORAGE MEDIUM ADAPTED FOR COMMUNICATION BETWEEN MULTIPLE TERMINAL DEVICES WITHIN A GROUP

CROSS-REFERENCE TO RELATED APPLICATION

This application is based upon and claims the benefit of priority from the prior Japanese Patent Application No. 2014-71221, filed on Mar. 31, 2014, the entire contents of which are incorporated herein by reference.

BACKGROUND

1. Field

The present invention relates to communication technology and, more particularly, to terminal devices, management devices, storage mediums adapted for communication between a plurality of terminal devices within a group.

2. Description of the Related Art

A technology for improving the usability of a plurality of users using a single communication terminal device such as a cell phone is proposed. For example, the user using a terminal device is requested to enter a security code. When personal authentication is completed, configuration data (telephone number, mail address, etc.) and personal data (telephone directory, mails, images, etc.) are automatically switched into use (see, for example, patent document 1).
[Patent Document 1] JP2005-252610

In a business wireless system, a group including a plurality of terminal devices is formed and communication is performed by using at least one base station device to assign a channel to each group. In a business wireless system like this, intra-group phone calls are mainly used and communication takes place in one-to-multiple mode. In general, a plurality of terminal devices in a business wireless system are arranged in an office. The user carries one of the terminal devices with him or her when going to a site. For this reason, the plurality of terminal devices are configured not to require a user operation for authentication and the same configuration is defined in the devices so that any user can use any terminal device in the same manner. To improve safety of communication in this situation, authentication of a user using the terminal device is required.

SUMMARY

To address the aforementioned issue, a terminal device according to an embodiment is used in a communication system where a group including a plurality of terminal devices is formed and communication is performed by using at least one base station device to assign a channel to each group, the terminal device comprising: a transmission unit that uses a channel assigned by the base station device to a first group for transmission; an authentication processing unit that performs an authentication process for authenticating a user using the terminal device; and a selection unit that selects one of a second group that only the terminal devices for which the authentication process is completed can subscribe to, and the first group, when the authentication process is completed. When the second group is selected in the selection unit, the transmission unit uses the channel assigned by the base station device to the second group for transmission.

Another embodiment relates to a management device. The management device is used in a communication system where a group including a plurality of terminal devices is formed and communication is performed by using at least one base station device to assign a channel to each group, the management device comprising: a first management unit that manages a plurality of terminal devices included in a first group; and a second management unit that manages a plurality of terminal devices included in a second group that only the terminals for which an authentication process for authenticating a user using the terminal device is completed can subscribe to.

Optional combinations of the aforementioned constituting elements, and implementations in the form of methods, apparatuses, systems, recording mediums, and computer programs may also be practiced as additional modes.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 4A-4B show a data structure of a database stored in the storage unit of FIG. 3;

FIG. 6 shows another exemplary data structure output from the communication unit of FIG. 3;

FIG. 7 shows still another exemplary data structure output from the communication unit of FIG. 3;

DETAILED DESCRIPTION

Figure 1:
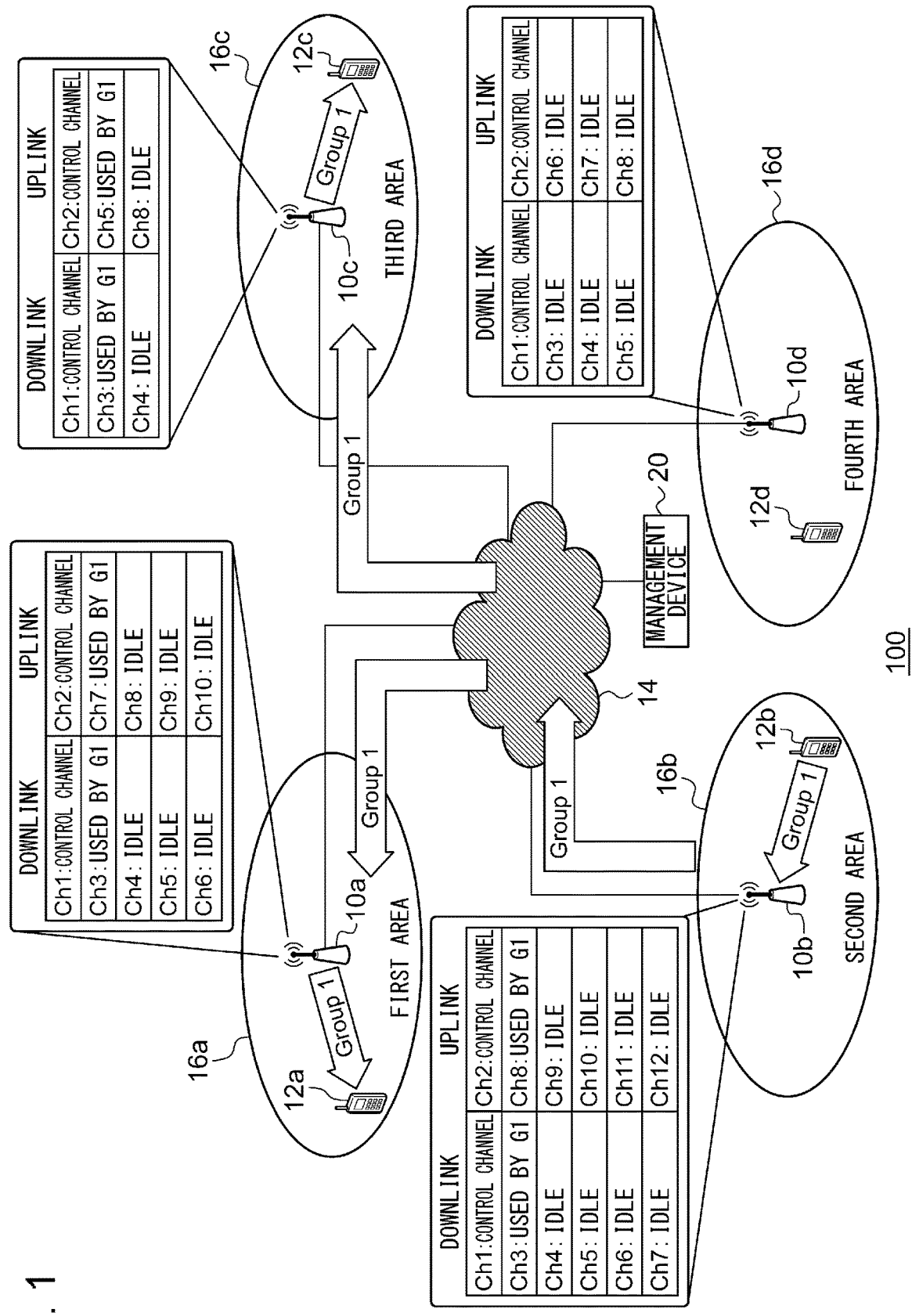
FIG. 1 shows the configuration of a business wireless system 100 according to Embodiment 1.

The invention will now be described by reference to the preferred embodiments. This does not intend to limit the scope of the present invention, but to exemplify the invention.

(Embodiment 1) A summary of the present invention will be given before describing the invention in specific detail. Embodiment 1 relates to a business wireless system including a plurality of base station devices connected to a network, a plurality of terminal devices connected to the respective base station devices, and a managing device connected to the network. In the business wireless system, the plurality of terminal devices form a group. The base station device assigns an uplink channel and a downlink channel to a group. In this setup, one of the terminal devices in a group (hereinafter, referred to as "transmitting device") transmits a signal using the uplink channel, and another terminal device in the group (hereinafter, referred to as "receiving device") receives the signal using the downlink channel. Base station devices other than the base station device to which the transmitting device is connected also assign a downlink channel to the group so that the receiving device connected to the other base station device can also receive the signal. A similar process is performed in the other groups but communication between different groups does not take place.

As described above, users attempting to use a terminal device need to be authenticated to secure safety of communication. Meanwhile, a group may include terminal devices in which user authentication is not completed and communication from a terminal device in which user authentication is completed to a terminal device in which user authentication is not completed may be necessary. In order to secure safety of communication in this situation, the business wireless system according to Embodiment 1 performs the following process. In the business wireless system, some users attempting to use a terminal device are authenticated by user authentication and the other users attempting to user a terminal device are not authenticated by user authentication. Regardless of whether the user is authenticated by user authentication, an ordinary group is formed.

Further, an authenticated group is automatically formed by the authenticated terminal devices. For this reason, the authenticated terminal devices belong to both the ordinary group and the authenticated group. An authenticated terminal device transmits a signal to the authenticated group or the ordinary group. Meanwhile, the authenticated terminal device receives a signal from terminal devices included in the authenticated group and those in the ordinary group. If the authenticated group is selected as a destination of transmission, safety of communication is secured. Meanwhile, the ordinary group may be selected as a destination of transmission and the authenticated terminal device can receive signals from both groups. Therefore, the usability in communication is secured. In order to implement this, the terminal device displays a list of group available for use, i.e., a list of groups of different categories. Also, the terminal device displays details of the authenticated groups (list of terminal devices, list of user names, etc.). In the following description, the term "group" may be used to denote an authenticated group and an ordinary group generically, or used to denote an ordinary group.

FIG. 1 shows the configuration of a business wireless system 100 according to embodiment 1. The business wireless system 100 includes a first base station device 10a, a second base station device 10b, a third base station device 10c, and a fourth base station device 10d, which are generically referred to as base station devices 10, a first terminal device 12a, a second terminal device 12b, a third terminal device 12c, and a fourth terminal device 12d, which are generically referred to as terminal devices 12, a network 14, and a management device 20. The first base station device 10a forms a first area 16a, the second base station device 10b forms a second area 16b, the third base station device 10c forms a third area 16c, and the fourth base station device 10d forms a fourth area 16d. The first area 16a, the second area 16b, the third area 16c, and the fourth area 16d are generically referred to as areas 16. The number of base station devices 10 and the number of terminal devices 12 are not limited to "4."

The first base station device 10a through the fourth base station device 10d are connected via the network 14. The base station devices 10 are capable of assigning a plurality of channels and assign the channels to groups. A known technology may be used for the channels. By way of example, it will be assumed that the plurality of channels are multiplexed by Time Division Multiple Access (TDMA)/Frequency Division Duplex (FDD). For example, the first base station device 10a defines Ch1, and Ch3 through Ch6 as downlink channels and defines Ch2, and Ch7 through Ch10 as uplink channels.

Ch1 is used as a downlink control channel and Ch2 is used as an uplink control channel. A combination of Ch3 and Ch7 is assigned to the same group. Ch4 through Ch6 and Ch8 through Ch10 are similarly assigned. The other base station devices 10 assign channels similarly. The number of channels that can be defined may or may not differ depending on the base station device 10. If the number of channels is common to the base station devices 10, two channels other than the downlink control channel and the uplink control channel are defined in each of the downlink channel and the uplink channel. Alternatively, a plurality of frequency channels may be used for each of the downlink channel and the uplink channel. It will be assumed that Ch1 and Ch2 are commonly used as the downlink control channel and the uplink control channel, respectively, for all base station devices 10. Referring to FIG. 1, one frequency channel is defined for use in the uplink channel and another frequency channel is defined for use in the downlink channel. However, a plurality of frequency channels may be defined for each of the uplink channel and the downlink channel.

The terminal device 12 is a wireless terminal capable of communicating with another terminal device 12 via the base station device 10. Phone-call communication is assumed herein. Data communication may also take place. Upon entering the area 16, the terminal device 12 requests the base station device 10 forming the area 16 to register the location of the terminal device 12. In this process, registration of the group is used is also requested. These requests are included in the uplink control channel (Ch2) and are transmitted accordingly. Signals in the uplink control channel are transmitted on a random access basis. In response to the request, the base station device 10 registers the terminal devices 12 in a group.

When a call is originated in one of the terminal devices 12, the calling terminal device 12 uses Ch2 to transmit an uplink control channel signal including a call request. The base station device 10 receiving the uplink control channel signal defines the calling terminal device 12 as the transmitting device and assigns channels to the group in which the transmitting device is included. The term "channels" here generically refers to downlink channels and uplink channels. The base station device 10 requests the other base station devices 10 to assign channels to the group via the network 14. In response to the request, the other base station devices 10 examine whether the group is registered. If the group is registered, the other base station devices 10 assign channels to the group.

The base station device 10 and the other base station devices 10 transmit downlink control channel signals including information on the assigned channels to the terminal devices 12. The rest of the terminal devices 12 included in the group (receiving devices) as well as the transmitting device recognize the assigned channels by receiving the downlink control channel signals. The transmitting device transmits a signal to the base station device 10 using the assigned uplink channel. The signal includes a digitized sound signal. If a receiving device is included in the group in which the transmitting device is included, the base station device 10 transmits the signal using the assigned downlink channel. In addition, the base station device 10 transmits the received signal to the other base station devices 10. The other base station devices 10 transmit the signal to the receiving devices using the assigned downlink channel. The receiving devices play back the sound signal based on the received signal and output the sound from the speaker.

In this way, a plurality of groups each including a plurality of terminal devices 12 are formed. Each of the plurality of base station devices 10 assigns channels in units of groups. As a result, communication takes place from one of the terminal devices 12 included in a group to which the channels are assigned to the rest of the terminal devices 12 included in the group.

In the plurality of terminal devices 12 included in a group, the transmitting device and the receiving device may change their roles. If a signal that should be transmitted is generated in the terminal device 12 operating as the receiving device, the terminal device 12 is switched into a transmitting device by transmitting an uplink control channel signal including a call request. The terminal device 12 operating as the transmitting device is switched into a receiving device once the terminal device 12 completes the transmission of the signal. Intra-group calls such as this use one of the channels of the base station devices 10 when a phone call is generated. Therefore, if any of the terminal devices 12 included in the same group is registered in the base station devices 10 over an extensive range, one phone call uses as many channels as the number of base station devices 10. The above-described process is performed in each group.

FIG. 1 shows that a phone call is being made is Group 1. The second terminal device 12b is the transmitting device. The second terminal device 12b transmits a signal using Ch8 of the second base station device 10b. Group 1 is registered in the first base station device 10a and the third base station device 10c. Therefore, the first terminal device 12a receives the signal using Ch3 of the first base station device 10a, and the third terminal device 12c receives the signal using Ch3 of the third base station device 10c. Meanwhile, Group 1 is not registered in the fourth base station device 10d so that the signal from the second terminal device 12b is not output to the fourth base station device 10d.

For example, when Group 1 is registered only in the second base station device 10b, and when a call occurs in Group 1, the transmitting device transmits a signal using Ch8 of the second base station device 10b and the receiving device receives the signal using Ch3 of the second base station device 10b. Thus, only one pair of channels of one base station device 10 are used. If Group 1 is registered in two base station devices 10, one pair of channels are used in each of the two base station devices 10 when a phone call in Group 1 is generated. Therefore, two pairs of channels are used. This is equivalent to consuming as many channels as consumed in one-to-one phone call in a cell phone system. If Group 1 is registered in three or more base station devices 10, three or more pairs of channels are consumed. If all of the channels of the third base station device 10c are used by other groups, a phone call in Group 1 does not take place in the third base station device 10c. This is equivalent to a missed call or a busy state.

Prior to the communication process described above, the terminal device 12 may perform an authentication process with the base station device 10. The authentication process may not be performed in the base station device 10 but in an authentication device connected to the network 14 instead. The authentication process will be described in further details later. The terminal device 12 transmits an authentication result (e.g., information indicating the state of being authenticated or unauthenticated) to the base station device 10. The management device 20 receives the authentication result from the base station device 10. Regardless of the authentication result, the management device 20 includes all terminal devices 12 in the ordinary group and includes authenticated terminal devices 12 in the authenticated group. As described above, the authenticated terminal device 12 is included in the ordinary group and the authenticated group. In response to the information transmitted by the terminal device 12, the management device 20 transmits information on the situation of authentication of the other terminal devices included in the group. The information on the situation of authentication indicates an ordinary group or an authenticated group.

The base station device 10 transmits the information on the situation of authentication by using the downlink control channel. The terminal device 12 receives the information on the situation of authentication and displays the information on the situation of authentication. As a result, the user using the authenticated terminal device 12 can select an ordinary group or an authenticated group as a destination of transmission. Meanwhile, the user using the unauthenticated terminal device 12 can only select an ordinary group as a destination of transmission.

Figure 2:
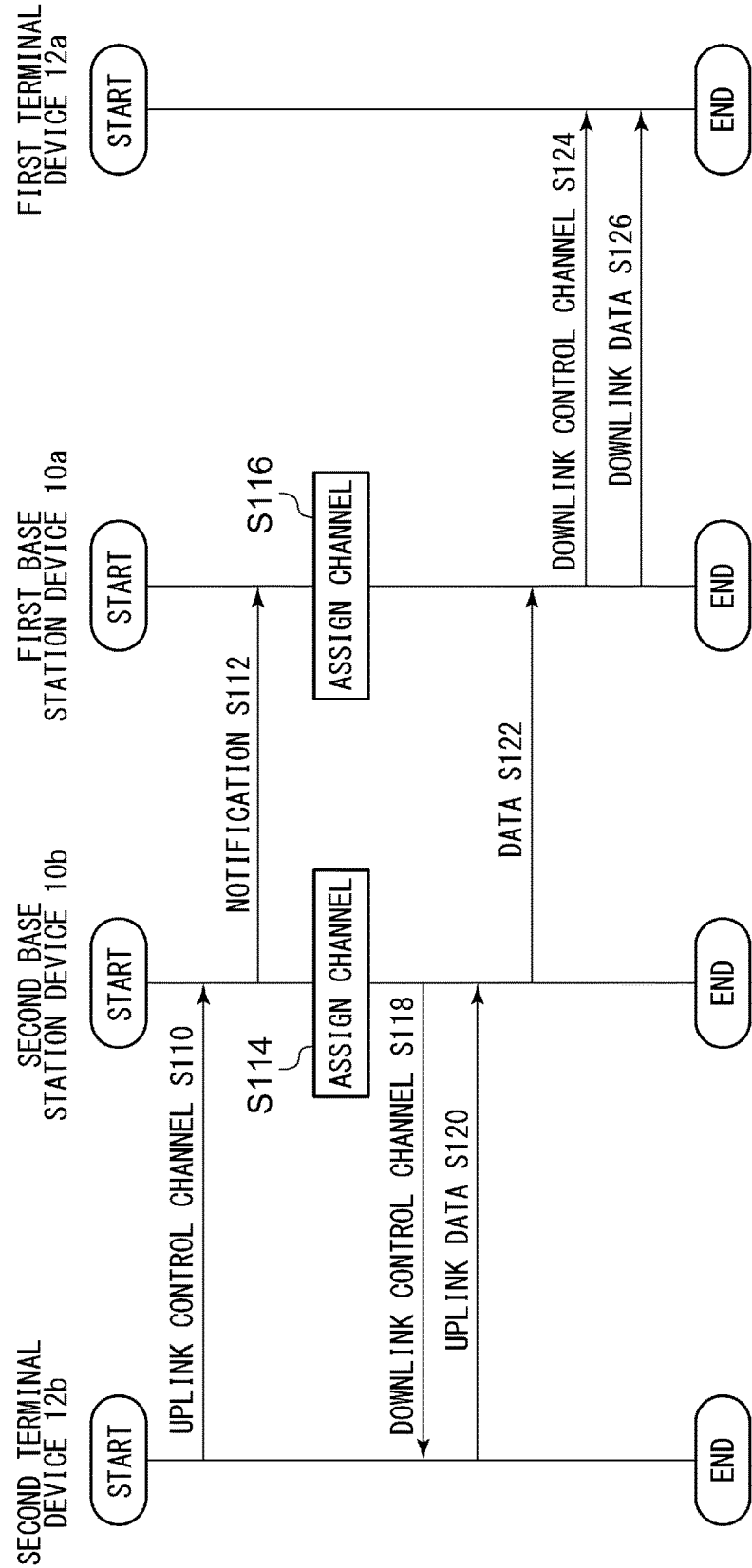
FIG. 2 is a sequence diagram showing the steps of communication in the business wireless system of FIG. 1.

FIG. 2 is a sequence diagram showing the steps of communication in the business wireless system 100. The diagram shows the steps of communication in an ordinary group. The second terminal device 12b transmits a call request using the uplink control channel (S110). The second base station device 10b communicates the call request to the first base station device 10a (S112). The second base station device 10b and the first base station device 10a assign channels to Group 1 (S114, S116). The second base station device 10b transmits a result of assignment using the downlink control channel (S118). The second terminal device 12b transmits uplink data to the second base station device 10b (S120). The second base station device 10b transmits the data to the first base station device 10a (S122). The first base station device 10a transmits the result of assignment using the downlink control channel (S124). The first base station device 10a transmits downlink data to the first terminal device 12a (S126).

Figure 3:
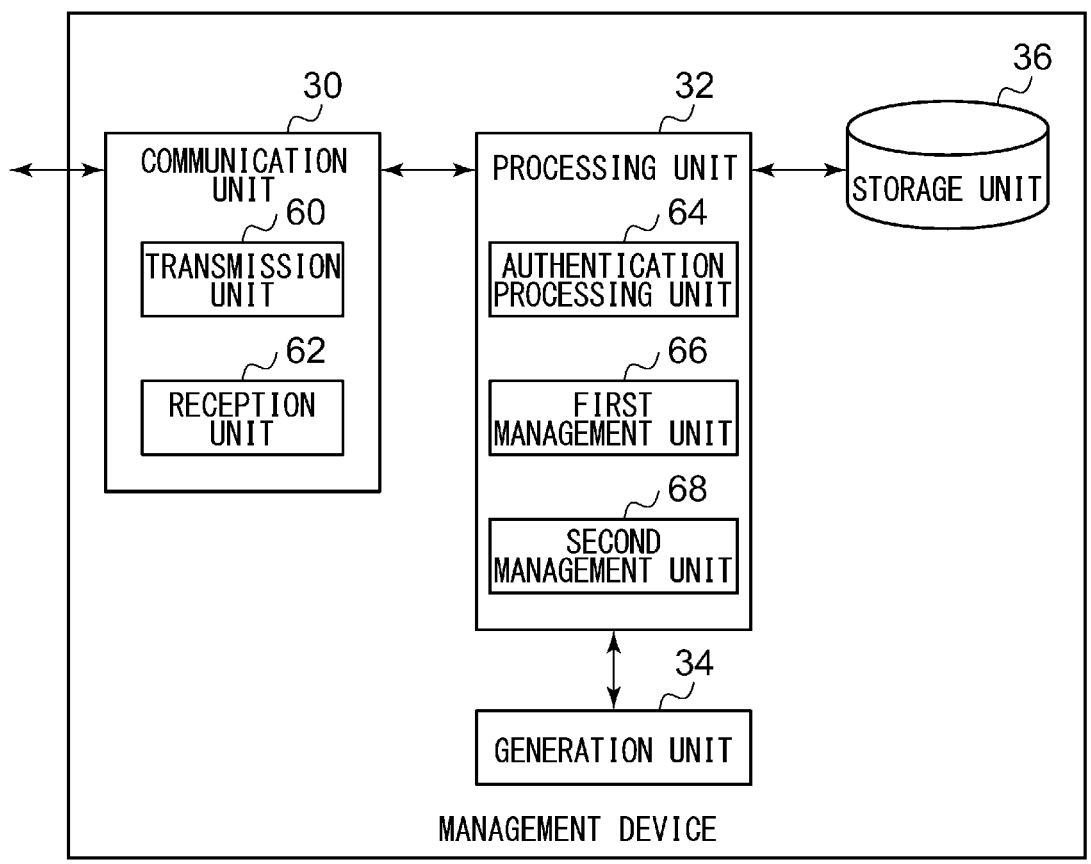
FIG. 3 shows the configuration of the management device of FIG. 1.

FIG. 3 shows the configuration of the management device 20. The management device 20 includes a communication unit 30, a processing unit 32, a generation unit 34, and a storage unit 36. The communication unit 30 includes a transmission unit 60 and a reception unit 62. The processing unit 32 includes an authentication processing unit 64, a first management unit 66, and a second management unit 68.

The authentication processing unit 64 performs a process of authenticating the terminal device 12 via the communication unit 30. The authentication process will be described later. The reception unit 62 is connected to the network 14 and receives information on the authentication result from the terminal device 12 via the base station device 10. The authentication processing unit 64 receives the information on the authentication result from the reception unit 62 and stores the information in the storage unit 36. The storage unit 36 stores the information on the authentication result of the plurality of terminal devices 12 included in each group in a database. FIGS. 4A-4B show a data structure of the database stored in the storage unit 36. In the example shown in FIG. 4A, "group name," "terminal device ID," and "authentication result" are included. A group name (group number) indicates information identifying a group including the terminal device 12. "Terminal device ID" is also called "UnitID" and is a numeral uniquely identifying the terminal device. "Authorized" in the authentication result field indicates the state of being already authorized, and "unauthorized" in the authentication result field indicates the state of not being authorized. The database may additionally store "user name" as in the example shown in FIG. 4B. As described later, if the authentication result includes a user name, "user name" is recorded for the terminal device in which the authentication result indicates "authorized." If the authentication result is "unauthorized," the user name field for the terminal device is left blank. "User ID" may be stored in place of "user name." "User ID" is a numeral, string of symbols, a string of characters, etc. capable of uniquely identifying a user. As compared with "user name," "user ID" is difficult for a user to intuitively understand but has the benefit of being represented in a smaller number of bits. Reference is made back to FIG. 3.

The process in the processing unit 32 will be described in further detail. Regardless of whether the information on the authentication result indicates "unauthorized" or "authorized," the first management unit 66 stores information on the terminal device corresponding to the authentication result. This step represents registration in an ordinary group. As shown in FIGS. 4A-4C, group names "1" and "2" representing ordinary groups, are recorded. In this way, the first management unit 66 manages the plurality of terminal devices 12 included in ordinary groups. Management refers to registration and deletion of information in the database.

If the information on the authentication result indicates "authorized," the second management unit 68 stores the authenticated group name corresponding to the authentication result in the database. More specifically, group names "1'" and "2'" of authenticated groups are registered as shown in FIGS. 4A-4B. The group ID for the authenticated group may be determined by the base station device 10 or the management device 20 or determined in advance. As described above, the authorized group is a group that only those terminal devices 12 included in the ordinary group for which the authentication process is completed can subscribe to. In this way, the second management unit 68 manages the plurality of terminal devices 12 included in an authenticated group.

Figure 5:
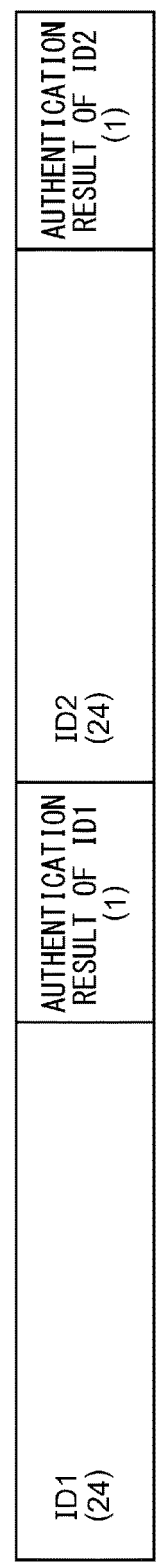
FIG. 5 shows an exemplary data structure output from the communication unit of FIG. 3.

The generation unit 34 receives the database stored in the storage unit 36 via the processing unit 32. The generation unit 34 extracts information related to the ordinary group and authenticated group subject to the process. By combining the information on the authentication result of terminal devices 12 in the group, the generation unit 34 generates information on the situation of authentication. The information on the authentication result indicates distinction between the ordinary group and the authenticated group. In this embodiment, the message for transmitting the information on the situation of authentication is referred to as "BroadcastIdentifiedData." FIG. 5 shows an example of "BroadcastIdentifiedData" output from the communication unit 30. "BroadcastIdentifiedData" is a message broadcast from the base station device 10 using the downlink control channel.

"ID1" is a terminal device ID (UnitID) for identifying the first terminal device 12 and is comprised of, for example, 24 bits. "Authentication result of ID1" is an authentication result of the user of the first terminal device 12 and is comprised of 1 bit. If the terminal device 12 is authenticated, "1" is entered. If not, "0" is entered. In the latter case, it indicates that the terminal device is included only in the ordinary group. In the former case, the terminal devices is included in the authenticated group as well. "ID2" and "authentication result of ID2" are the terminal device ID and the authentication result of the second terminal device 12 and are similarly configured as "ID1" and "authentication result of ID1." "BroadcastIdentifiedData" in this case is capable of representing information for two terminal devices by using 50 bits. Given, for example, that the unit of data transmitted in the downlink control channel in a given digital wireless standard is 64 bits, efficient transmission can take place by using 64 bits or fewer to construct "BroadcastIdentifiedData" for one terminal device. As indicated in the example shown in FIG. 5, the transmission efficiency is better by representing the information for two terminal devices in 64 bits or fewer.

FIG. 6 shows another example of "BroadcastIdentifiedData" output from the communication unit 30. This example is adapted for a case where the user ID of an authenticated user is stored in the database in the storage unit 36. "ID1," "authentication result of ID1," and "user ID for ID1" are associated with each other. "ID1" and "authentication result of ID1" are as described above. "User ID for ID1" includes 39 bits. As illustrated, a total of 64 bits are used.

If a special user ID is made available to indicate that the terminal device with the terminal device ID is unauthenticated, 1 bit indicating the authentication result of the terminal device ID may be deleted and 40 bits may be used for the user ID. For example, a virtual user ID with all zero bits may be used as the user ID indicating that the terminal device 12 is not authenticated, and ordinary user IDs may have other values. Alternatively, if it is desired to display the user name corresponding to the user ID in the terminal device 12, information indicating mapping between user IDs and user names may be stored in each terminal device 12. Alternatively, the mapping information may be broadcast from the base station device 10 to each terminal devices 12.

FIG. 7 shows still another example of "BroadcastIdentifiedData" output from the communication unit 30. As shown in the figure, "ID1" and "user name for ID1" are provided. This example represents a data structure adapted for a case where the user name of the authenticated user is stored in the database of the storage unit 36. "ID1" is as described above. "User name for ID1" represents data produced by encoding the user name of the user using the terminal device with "ID1" in a character code such as ASCII code or Unicode. In the example shown in FIG. 7, the field storing "user name" includes 104 bits, and "BroadcastIdentifiedData" includes 128 bits. Given that the unit of data transmitted in the downlink control channel in a digital wireless standard is 64 bits, "BroadcastIdentifiedData" is transmitted by using two units. As in the case of the user ID described above, a special user name (e.g., a blank character) indicating that the terminal device 12 is not authenticated is used. The data size of the field storing the user name is by way of example only. The data size may be longer or shorter than 104 bits. Reference is made back to FIG. 3.

The transmission unit 60 transmits the information on the situation of authentication generated in the generation unit 34 to the base station device 10 via the network 14. As described above, the base station device 10 transmits the information on the situation of authentication to the terminal device 12 by using the downlink control channel.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 8:
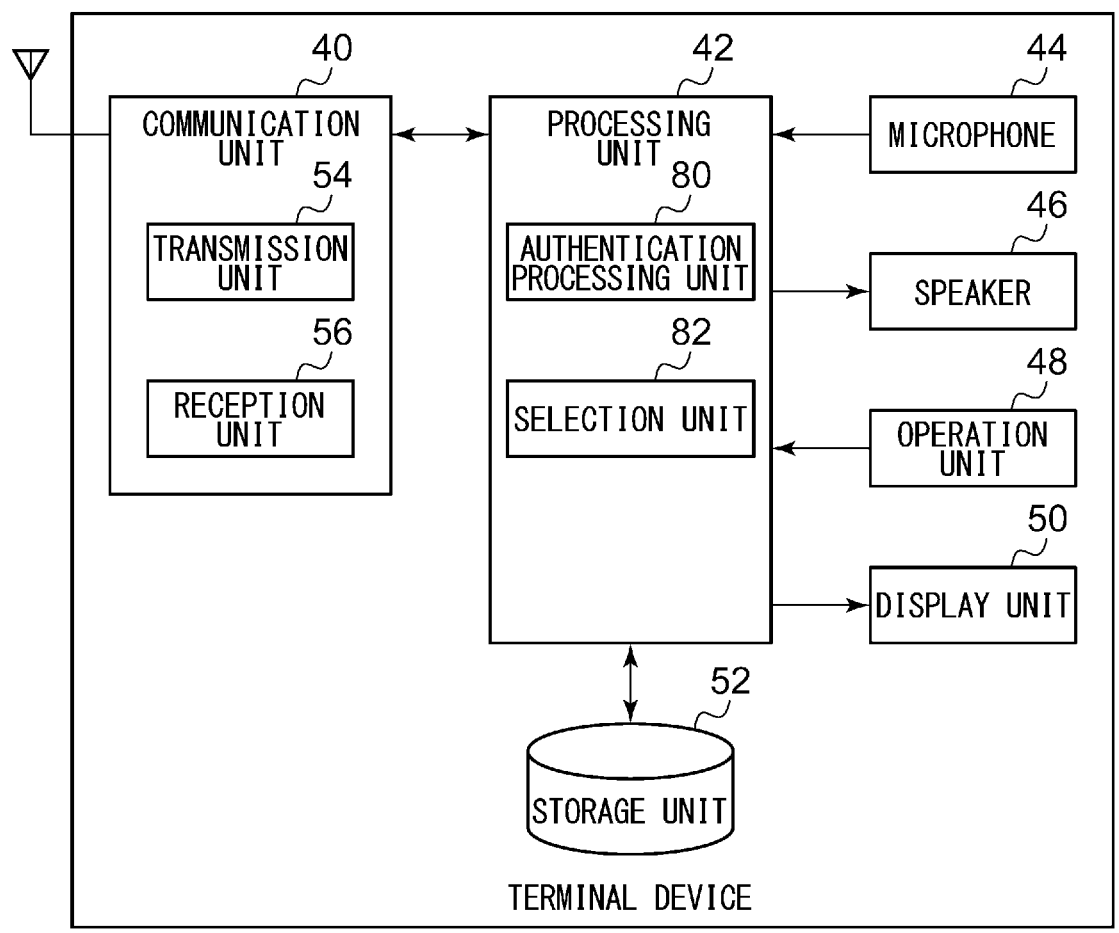
FIG. 8 shows the configuration of the terminal device of FIG. 1.

FIG. 8 shows the configuration of the terminal device 12. The terminal device 12 includes a communication unit 40, a processing unit 42, a microphone 44, a speaker 46, a operation unit 48, a display unit 50, and a storage unit 52. The communication unit 40 includes a transmission unit 54 and a reception unit 56. The processing unit 42 includes an authentication processing unit 80 and a selection unit 82.

The microphone 44 receives sound from the user in a phone call and converts the sound into a sound signal. The microphone 44 outputs the sound signal to the processing unit 42. The speaker 46 receives the sound signal from the processing unit 42 in a phone call and outputs the sound signal as sound. The speaker 46 may output alert sound, etc. The operation unit 48 is composed of a touch panel, etc. and receives a user input. The operation unit 48 outputs the received input to the processing unit 42. The display unit 50 receives an image and a message from the processing unit 42 and displays the image and the message. Where a touch panel screen is used, the display unit 50 and the operation unit 48 are built as one unit. The display unit 50 may not be included in the terminal device 12. A display device (not shown) may be connected to the terminal device 12 so that the external display device is caused to display information.

The authentication processing unit 80 of the processing unit 42 performs an authentication process with the base station device 10, the authentication device (not shown), or the management device 20, in coordination with the communication unit 40. For example, a password or a security code may be used for the authentication process. In this case, when a password (personal identification number) is entered and authentication is successful, a registration process for registration in the system is performed. In association with the ID identifying the terminal device 12 that is authenticated, the terminal device 12 may transmit the user name (login name) to the base station device 10. In this case, the base station device 10 also transmits, to the terminal devices 12, data that maps the terminal device ID to the user name. Master data (information such as passwords and user names) necessary for the authentication process may be stored in a database outside the terminal device 12 (e.g., in the base station device 10, authentication device, management device 20, etc.). Alternatively, the information may be stored in a nonvolatile memory in the terminal device 12.

If the information is stored in a nonvolatile memory in the terminal device 12, it is desirable that the information on all users that may use the terminal device 12 be stored. For example, if there are ten terminal devices 12 belonging to a given group and there are 20 users that may use the terminal device 12 (e.g., if the earliest 10 users of the 20 users use the terminal), it is desirable to store the user names and passwords of the 20 users in the terminal devices 12. In this way, each user can use any terminal device 12 so that the usability for users can be improved. This can also simplify the system configuration and so may be suitable for systems where the master data is not updated so frequently or for small-scale systems. Meanwhile, according to a method whereby the master data for the authentication process is stored outside the terminal device 12, the master data is managed in a centralized fashion so that the usability for users is similarly improved. Additionally, addition and change of user names and passwords can be processed in a relatively fewer steps. Therefore, the above approach is suitable for cases where change of passwords or addition/deletion of users occurs frequently. The following method exemplifies a method of user authentication.

The first user authentication method authenticates a user as a member of a group. For example, a password (a particular character string or numerical string) is communicated in advance only to uses belonging to a group and a user is expected to enter the password. This method only requires defining one password for one group and so is simple but cannot authenticate individual users. In this case, users using the terminal devices 12 belonging to a given group need only enter a common password and need not enter a user ID or a user name (login name) identifying the user individually. By implementing such authentication, the likelihood of the content of highly secretive communication (call) being picked up by an unauthorized person accessing the terminal device 12 illegally can be reduced. This method requires relatively less job for user input operation. If it is desired that a single terminal device be associated with a plurality of groups at the same time, users may be required to enter a plurality of passwords corresponding to those groups.

The second authentication method defines different user names (user IDs) and passwords for different users. A user enters his or her user name and password using the operation unit 48 for authentication. This method is not only capable of authenticating individual users but also is highly secure. Different passwords may be assigned to different users and a master database that maps the user names to the passwords may be stored so that users are requested to enter only the password. In this approach, entry of the user name can be omitted and the labor of the user can be reduced. The device storing the master data (a device that checks a match of passwords) determines whether the passwords in the master data contain a match with the password entered by the user. If a match is found, the device determines that the user mapped to the password made the entry and authenticates the user. Instead of these authentication methods that require entry of a password, users may be authenticated by using biometric authentication such as fingerprint authentication.

The authentication process is started by turning the power of the terminal device 12 on while pressing a certain key in the operation unit 48. The authentication process may be defined before the power of the terminal device 12 is turned off and started accordingly. Further, application software for wireless device configuration may be configured to start the authentication process when the power of the terminal device 12 is turned on. For the authentication process, the communication unit 40 uses the uplink control channel and the downlink control channel. As described above, the authentication process is performed prior to communication.

If the master data for the authentication process is stored outside the terminal device 12, the terminal device 12 transmits information such as the terminal device ID, and the password and user name (if entered), etc. entered by the user to the base station device 10 via the transmission unit 54. It is desirable that character information of the password, etc. be encrypted before being transmitted. If the management device 20 stores the master data for the authentication process, the authentication processing unit 64 receives the information such as the terminal device ID, and the password and user name (if entered), etc. entered by the user from the base station device 10 via the reception unit 62. The management device 20 checks if any match with the information is found in the master data stored in the storage unit 36. The management device 20 stores the check result (authentication result) in the database in the storage unit 36. If the authentication result does not include a user name, the storage unit 36 stores the result in the format shown in FIG. 4A. If the authentication result includes a user name, the storage unit 36 stores the result in the format shown in FIG. 4B. If the base station device 10 stores the master data for the authentication process, the base station device 10 checks the password and user name received against the master data and determines whether to authenticate the user. The base station device 10 communicates the information on the authentication result to the management device 20. The information on the authentication result includes the terminal device ID and indication as to whether the user is authenticated. The information may further include the user name. The authentication processing unit 64 of the management device 20 receives the authentication result from the base station device 10 via the reception unit 62 and stores the information in the database in the storage unit 36. If the device other than the terminal device 12 and the base station device 10 stores the master data for the authentication process, that device may similarly communicate the authentication result to the management device 20.

A description will be given of a process performed when the terminal device 12 stores the master data for the authentication process. The processing unit 42 checks the password and user name (if entered) entered by the user against the master data and determines whether to authenticate the user. In coordination with the transmission unit 54, the processing unit 42 transmits the information on the authentication result to the base station device 10 prior to communication. The information on the authentication result includes the terminal device ID and indication as to whether the user is authenticated. The information may further include the user name. In one example of the data structure for transmitting the information on the authentication result, 1 bit in RandomAccessRequest of the uplink control channel is used for transmission of the authentication result. The bit is set to "1" if authentication is given and to "0" if authentication is not given. The data structure can be used in a case where the information on the authentication result does not include the user name. Further, the base station device 10 outputs the information on the authentication result to the management device 20.

Further, by designing the usage of the terminal device ID appropriately, the processing unit 42 may transmit, in coordination with the communication unit 40, the authentication result using an ordinary position registration message while messages for position registration are exchanged with the base station device 10. For example, the terminal device IDs may be organized into authenticated IDs and unauthenticated IDs for use. To describe it in specific details, terminal device IDs: 0-5000 may be assigned as unauthenticated IDs, and terminal device IDs: 50001—may be assigned as authenticated IDs. Two terminal device IDs, i.e., an unauthenticated ID and an authenticated ID, are defined in each terminal device 12 and stored in the storage unit 52. For example, given that the unauthenticated ID of the first terminal device 12a is "1" and the authenticated ID is "5001," the processing unit 42 selects "5001" as the ID for transmission of an ordinary position registration message from the transmission unit 54, if the first terminal device 12a is authenticated. If the first terminal device 12a is not authenticated, the device selects "1" as the ID and sets the data in the position registration message.

The base station device 10 receiving the position registration message can determine whether the terminal device 12 is authenticated or not by examining whether the ID included in the message is "5001" or greater. By using a method like this, the authentication result of the terminal device 12 can be transmitted to the base station device 10 without introducing a new communication protocol and by using an ordinary position registration message. Further, if the business wireless system 100 is capable of processing subscription to a group, the business wireless system 100 may broadcast information on the terminal device 12 newly subscribing to the group only to the relevant group. As described above, for user authentication, information such as a password (an authentication request) for an authentication process in another device, or information on the result of authentication process in the terminal device 12 (an authentication result) is transmitted from the terminal device 12. The information transmitted in this step will be referred to as individual information or individual identification information. The individual information and individual authentication information transmitted from the terminal device 12 will be generically referred to as information on authentication.

As a response to the information on the authentication result transmitted by the transmission unit 54, the reception unit 56 receives from the base station device 10 the information on the situation of authentication of other terminal device 12 included in the group. As described above, the information is generated in the management device 20 and is transmitted by using the downlink control channel. It should be noted that the management device 20 basically generates the information on the situation of authentication related to all terminal devices 12 belonging to the group. In this way, the same data (information on the situation of authentication) can be transmitted to the terminal devices 12 all at once so that efficient communication can be performed. In some cases, however, the information on the situation of authentication of a given terminal device 12 (e.g., the first terminal device 12a) may be excluded from the information on the situation of authentication transmitted to that terminal device (the first terminal device 12a).

The information on the situation of authentication may be received at an alternative point of time. For example, the processing unit 42 transmits a request to transmit the information on the situation of authentication to the base station device 10 via the transmission unit 54. This is done when the user presses an authentication situation acquisition key in the operation unit 48 and when the time arrives periodically according to a timer. In this process, the uplink control channel is used. The request for transmission is output from the base station device 10 to the management device 20. Subsequently, the reception unit 56 receives the information on the situation of authentication from the base station device 10 in response to the request for transmission. The reception unit 56 outputs the information on the situation of authentication to the processing unit 42. The reception unit 56 also receives information on subscription of another and newly registered terminal device 12 by using the downlink control channel when a process of registering the other terminal device 12 is successful.

The processing unit 42 receives the information on the situation of authentication from the reception unit 56. The processing unit 42 creates a screen to show the other terminal devices 12 in the group based on the information on the situation of authentication. The display unit 50 displays display data (screen data) created in the processing unit 42. It can therefore be said that the display unit 50 displays the situation of authentication in the group based on the information received in the reception unit 56.

Figure 9:
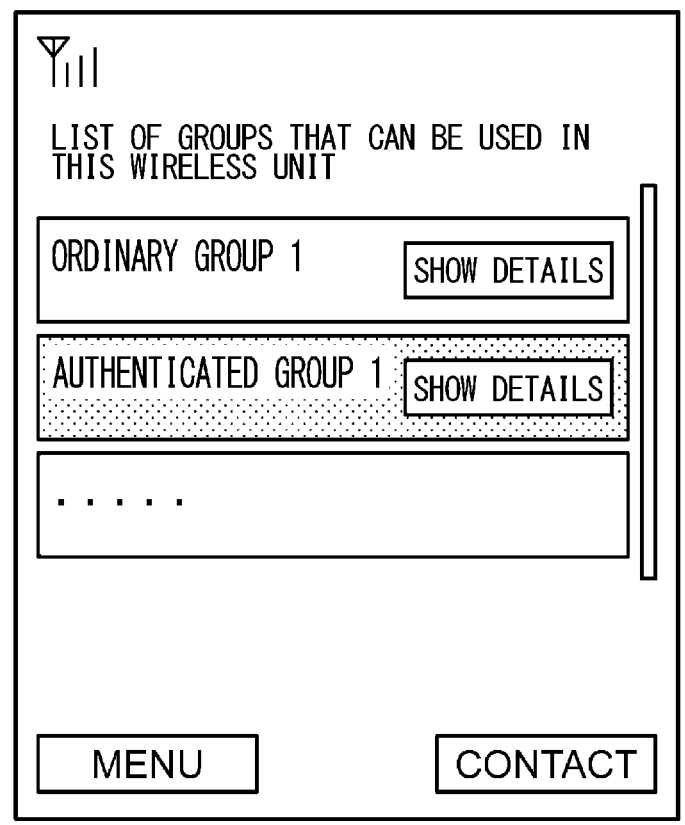
FIG. 9 shows a screen displayed in the display unit of FIG. 8.

FIG. 9 shows a screen displayed in the display unit 50. This represents a screen in the terminal device 12 belonging to the authenticated group. As illustrated, "ordinary group 1" and "authenticated group 1" that are as selectable are displayed on the screen, allowing the user to select which group to use to start communication. If authenticated group 1 is selected, transmission is made only to the authenticated terminal devices 12 among the terminal devices 12 belonging to the ordinary group. Therefore, the operation will be simplified. Groups may be colored according to the type of group. For example, the ordinary group may be in "red" and the authenticated group may be in "blue." Similarly, the font or icon may be changed depending on the type of group. Further, addition of an authenticated terminal device 12 may be displayed so as to alert the user. For example, the group name may be shown in a flashing mode. For example, "authenticated group 1" may be shown in a flashing mode or an alert sound may be output when the number of terminal devices 12 in "authenticated group 1" increases from 3 to 4. Referring to FIG. 9, the number of terminal devices 12 included in each group may be displayed in association with the names "ordinary group 1" and "authenticated group 1."

Figure 10:
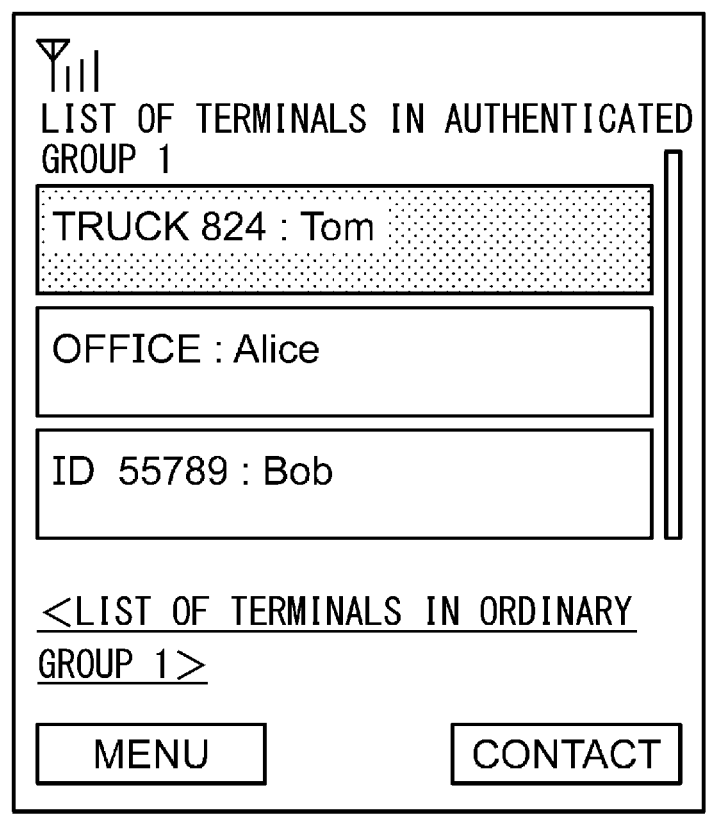
FIG. 10 shows an alternative screen shown in the display unit of FIG. 8.

FIG. 10 shows an alternative screen shown in the display unit 50. The screen shows details of the authenticated group. For example, when the user clicks a link, button, icon, etc. for "show details" associated with "authenticated group 1" in FIG. 9, a list of terminal devices 12 belonging to the authenticated group ("authenticated group 1") is displayed. The screen shows a list of contacts included in the authenticated group and an exemplary list of names (terminal device names) of the other terminal devices 12. "TRUCK824," "Office," "ID55789," etc. are IDs of the terminal devices 12. User names may be displayed in association with the IDs of the terminal devices 12. In FIG. 10, "Tom," "Alice," "Bob," etc. are user names. By displaying the list as illustrated, the user can easily know who is using which terminal device 12. The list screen shows terminal devices 12 that the user's device can communicate with. Therefore, the terminal device 12 displaying the screen (the user's terminal) is excluded from the information on the situation of authentication. As shown in FIG. 10, a link for displaying detailed information on the ordinary group ("ordinary group 1") corresponding to the authenticated group for which the details are shown may also be displayed. Further, the number of terminal devices 12 included in the authenticated group may be displayed. Still further, the ratio between the number of terminal devices 12 included in the authenticated group and number of terminal devices 12 included in the corresponding ordinary group, the associated percentage, etc. may be displayed. For example, given that the number of terminal devices in "ordinary group 1" is "20" and "3" terminal devices are included in the corresponding "authenticated group 1." The screen may display "3/20," "15% of the terminal devices are authenticated," etc.

If a link for "see details" associated with "ordinary group 1" is clicked, or if "link for displaying a list of terminal devices in ordinary group 1" in FIG. 10 is clicked, a list as shown in FIG. 10 for the ordinary group is displayed. As described above, the ordinary group includes a mixture of terminal devices 12 that are authenticated and terminal devices 12 that are not authenticated. In order to let the user know the situation of authentication, an icon or character indicating that the terminal device 12 is authenticated may be displayed near the ID of the terminal device 12 of the user name. For example, an icon of a key may be displayed to show that the terminal device is authenticated. In this way, the display unit 50 outputs a list of other terminal devices 12 included in the authenticated group or ordinary group. The display unit 50 may also show the situation of authentication of the terminal device that the user's terminal device is communicating with or the situation of authentication of users in the group, while a phone call is proceeding. As in FIG. 10, the display unit 50 may also make available a link for displaying the details of the authenticated group corresponding to the ordinary group displayed. As in the case of the authenticated group, the number of terminal devices 12 may be displayed. Reference is made back to FIG. 8.

A description will be given of an operation in which the user transmits a signal, i.e., originates a voice call, from the terminal device 12 while the screen of FIG. 9 or FIG. 10 is being displayed. It is assumed here that the authentication process in the authentication processing unit 80 is completed so that the following description relates to a process in the authenticated terminal device 12. The user uses the operation unit 48 to select either an authenticated group that only authenticated terminal devices 12 can subscribe to or an ordinary group any terminal device 12 can subscribe to. The selection unit 82 acquires the selection result and selects the authenticated group or the ordinary group depending on the selection result. It can therefore be said that selection in the selection unit 82 is made when a signal is transmitted. Selection may be made in each opportunity for transmission.

As described above, the processing unit 42 transmits a downlink control channel signal including a call request via the transmission unit 54. The call request includes information on the group selected in the selection unit 82. The base station device 10 receiving the uplink control channel signal assigns a channel corresponding to the group included in the call request and communicates the assignment by using the downlink control channel. If an authenticated group is selected, for example, the uplink channel corresponding to the authenticated group is assigned. If the ordinary group is selected, the uplink channel corresponding to the ordinary group is assigned.

A description will be given here of a case where the selected group is an authenticated group. The transmission unit 54 uses the uplink channel assigned by the base station device 10 to the authenticated group for transmission. The reception unit 56 in the other terminal devices 12 included in the authentication group uses the downlink channel assigned by the base station device 10 to the authenticated group for reception. Meanwhile, the reception unit 56 in the other terminal devices included only in the ordinary group cannot use the downlink channel assigned by the base station device 10 to the authenticated group for reception and so do not receive a signal. Only the authenticated terminal devices 12 are included in the authentication group.

Therefore, the authenticated group is selected when it is desired to communicate (talk about) highly secretive content.

A description will now be given of a case where the selected group is an ordinary group. The transmission unit 54 uses the uplink channel assigned by the base station device 10 to the ordinary group for transmission. The reception unit 56 in the other terminal devices 12 included in the ordinary group use the downlink channel assigned by the base station device 10 to the ordinary group for reception. As described above, the authenticated terminal devices 12 are also included in the ordinary group. Terminal devices 12 that are authenticated and terminal devices 12 that are not authenticated coexist in the ordinary group so that the ordinary group is selected when it is desired to communicate (talk about) relatively less secretive content to a larger number of terminal devices 12. Meanwhile, the reception unit 56 uses the downlink channels assigned to the authenticated group and the ordinary group for reception, whichever of the groups is selected. The process in the unauthenticated terminal device 12 proceeds by using the channels assigned to the ordinary group for transmission and reception.

If a given terminal device 12 belongs to a plurality of groups and if a phone call in one of the groups is received by the reception unit 56, the processing unit 42 and the speaker 46 output sound, and the processing unit 42 and the display unit 50 display the group name or the group ID on the screen. In the case of the terminal device 12 belonging to ordinary group 1 and authenticated group 1, sound is output whichever group is received. Since the group name is displayed, the content of phone call can be determined appropriately when the user makes a phone call in response to an incoming call.

As described above, the group ID for the authenticated group may be determined by the base station device 10 and communicated to the terminal devices 12 or may be determined in advance. A description will be given of the latter case. It will be given that the group IDs of the ordinary group are 1-100, the group IDs of the authenticated group are 501-600, and that the authenticated group corresponding to ordinary group 1 is identified by 501, the authenticated group corresponding to ordinary group 2 is identified by 502. According to this configuration, the step of communicating the group ID of the authenticated group from the base station device 10 to the terminal devices 12 can be omitted so that the traffic is reduced. For example, if the user using the terminal device 12 corresponding to group ID=1 wants to make a phone call only to the authenticated terminal device 12, the user may select the channel corresponding to group ID=501 and make transmission accordingly.

If the terminal device 12 is used by a plurality of users, it is desired to allow each user to configure the terminal device 12 in a manner unique to each other in order to improve the usability for the users. When the authentication process is completed, the processing unit 42 runs the configuration corresponding to the authenticated user. The configuration data unique to the user will be referred to as "dedicated data." For example, the storage unit 52 stores a plurality of sets of dedicated data, and the processing unit 42 selects one set of dedicated data from the storage unit 52 depending on the user name of the authenticated user.

In place of the storage unit 52, the base station device 10 may store a plurality of sets of dedicated data. In this process, the processing unit 42 requests the base station device 10 to transmit the dedicated data via the communication unit 40. The communication unit 40 receives the dedicated data transmitted in response from the base station device 10 and the processing unit 42 sets the dedicated data. A server connected to the network 14 may be used in place of the base station device 10. Further, at least one set of dedicated data may be stored in a battery charger for charging the terminal device 12. The processing unit 42 may receive the dedicated data from the battery charger when the terminal device 12 is connected to the battery charger. Methods described above may be used in arbitrary combinations.

For example, the dedicated data includes UnitID, availability/nonavailability of functions, UnitIDList, and GroupIDList. Alternatively, the dedicated data may represent modification from the basic data made during operation. Further, the dedicated data may be backed up when the power is turned off, when the terminal device 12 is connected or returned to the battery charger, when a unique user operation is performed in the terminal device 12, or when a user switch mode start key is used during operation.

Figure 11:
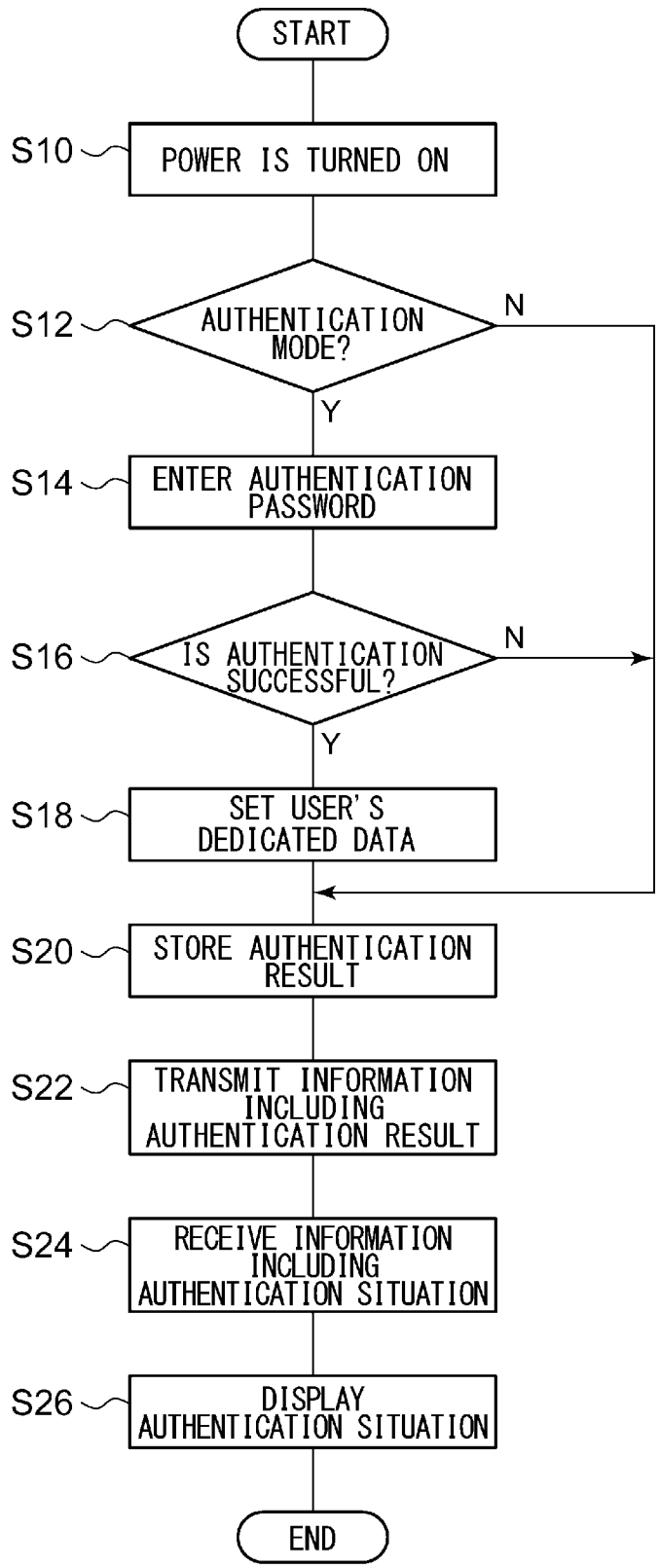
FIG. 11 is a flowchart showing the displaying steps performed by the terminal device of FIG. 8.

A description will be given of the operation in the business wireless system 100 with the structure described above. FIG. 11 is a flowchart showing the displaying steps in the terminal device 12. The power is turned on (S10). If the authentication mode is in effect (Y in S12), an authentication password is entered in the operation unit 48 (S14). If authentication is successful in the processing unit 42 and the communication unit 40 (Y in S16), the processing unit 42 sets the user's dedicated data (S18). If the authentication mode is not in effect (N in S12) or authentication is not successful (N in S16), steps 14 through 18 are skipped. The storage unit 52 stores the authentication result (S20). The processing unit 42 and the transmission unit 54 transmit information including the authentication result (S22). The reception unit 56 and the processing unit 42 receive the information including the situation of authentication (S24). The display unit 50 displays the situation of authentication (S26). Step 24 may not necessarily be executed in correspondence with step 22 and may be executed at an appropriate point of time.

Figure 12:
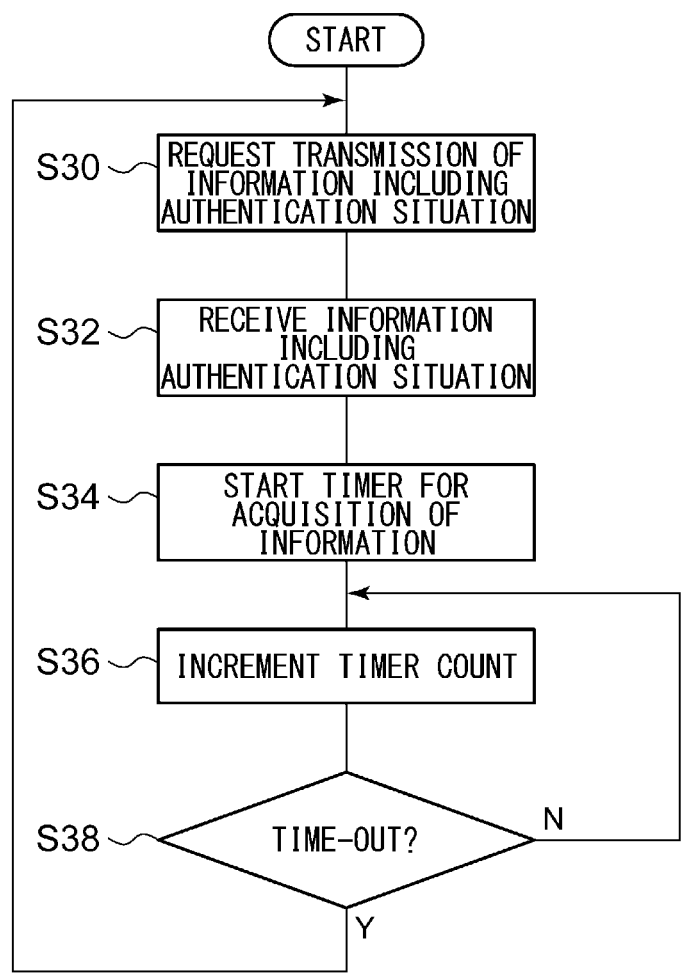
FIG. 12 is a flowchart showing the steps of requesting a situation of authentication performed by the terminal device of FIG. 8.

FIG. 12 is a flowchart showing the steps of requesting a situation of authentication performed by the terminal device 12. The processing unit 42 and the transmission unit 54 request the transmission of information including the situation of authentication (S30). The reception unit 56 and the processing unit 42 receive the information including the situation of authentication from the management device 20 via the base station device 10 (S32). The processing unit 42 starts a timer for acquisition of information (S34). The processing unit 42 increments the timer count (S36). If a time-out does not occur (N in S38), control is returned to step S36. Meanwhile, if a time-out occurs (Y in S38), control is returned to step S30. Through these steps, the terminal device 12 receives the information including the situation of authentication at a predetermined period so that the user can always access the latest situation of authentication.

Figure 13:
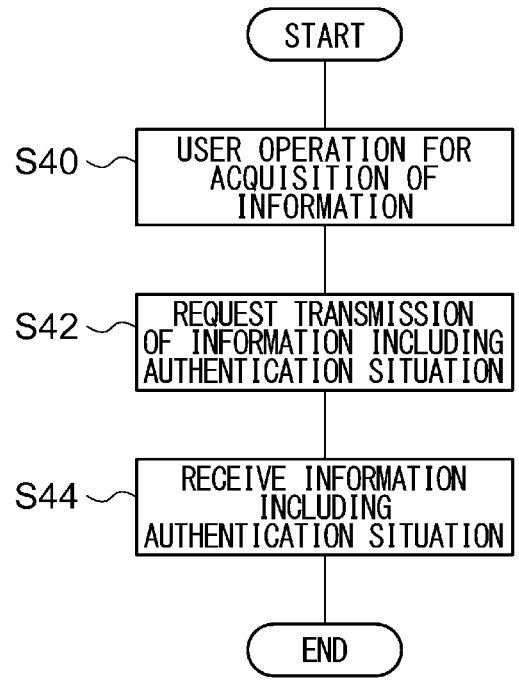
FIG. 13 is a flowchart showing the alternative steps of requesting a situation of authentication performed by the terminal device of FIG. 8.

FIG. 13 is a flowchart showing the alternative steps of requesting a situation of authentication performed by the terminal device 12. The user performs a user operation to acquire the information via the operation unit 48 (S40). The processing unit 42 and the transmission unit 54 request the transmission of the information including the situation of authentication (S42). The reception unit 56 and the processing unit 42 receive the information including the situation of authentication from the management device 20 via the base station device 10 (S44).

Figure 14:
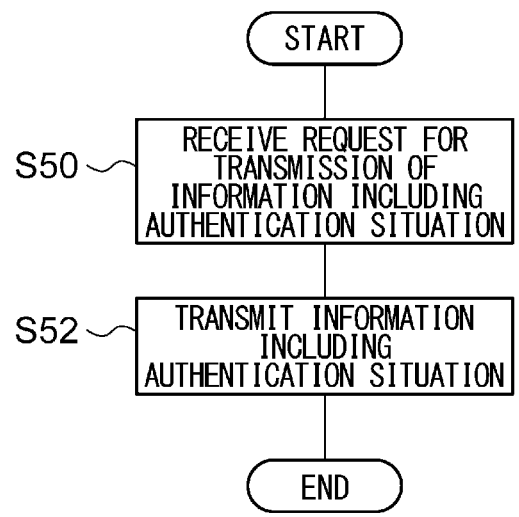
FIG. 14 is a flowchart showing the steps of communicating the situation of authentication performed by the management device of FIG. 3.

FIG. 14 is a flowchart showing the steps of communicating the situation of authentication performed by the management device 20. The reception unit 62 and the processing unit 32 receive the request for transmission of information including the situation of authentication (S50). The generation unit 34, the processing unit 32, and the transmission unit 60 transmit the information including the situation of authentication (S52).

Figure 15:
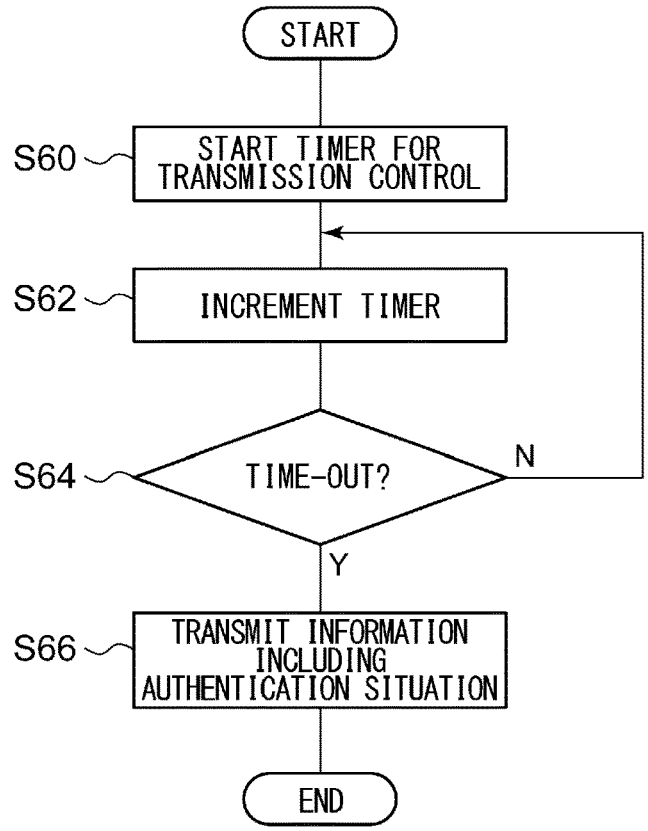
FIG. 15 is a flowchart showing the alternative steps of communicating the situation of authentication performed by the management device of FIG. 3.

FIG. 15 is a flowchart showing the alternative steps of communicating the situation of authentication performed by the management device 20. The processing unit 32 starts a timer for transmission control (a timer for transmitting the information including the situation of authentication at a predetermined period) (S60). The processing unit 32 increments the timer count (S62). If a time-out does not occur (N in S64), control is returned to step S62. If a time-out occurs (Y in S64), the generation unit 34, the processing unit 32, and the transmission unit 60 transmit the information including the situation of authentication (S66).

Figure 16:
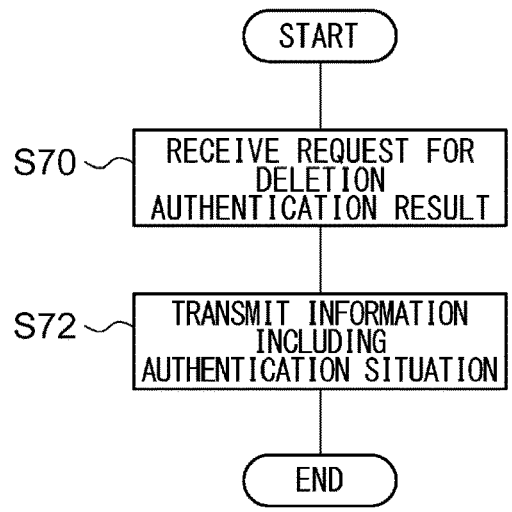
FIG. 16 is a flowchart showing the steps of deleting the authentication result performed by the management device of FIG. 3.

FIG. 16 is a flowchart showing the steps of deleting the authentication result performed by the management device 20. When, for example, the power of the terminal device 12 is turned down, a message requesting deletion is sent from the terminal device 12 (the first terminal device 12a) to the management device 20 via the base station device 10. The reception unit 62 and the processing unit 32 receive the request for deletion of the authentication result (S70). The message for requesting deletion includes the terminal device ID so that the terminal device ID (the ID of the first terminal device 12a) in the current information on the situation of authentication is deleted and new information on the situation of authentication is created. The generation unit 34, the processing unit 32, and the transmission unit 60 transmit the new information including the situation of authentication to the terminal devices 12 (S72).

Figure 17:
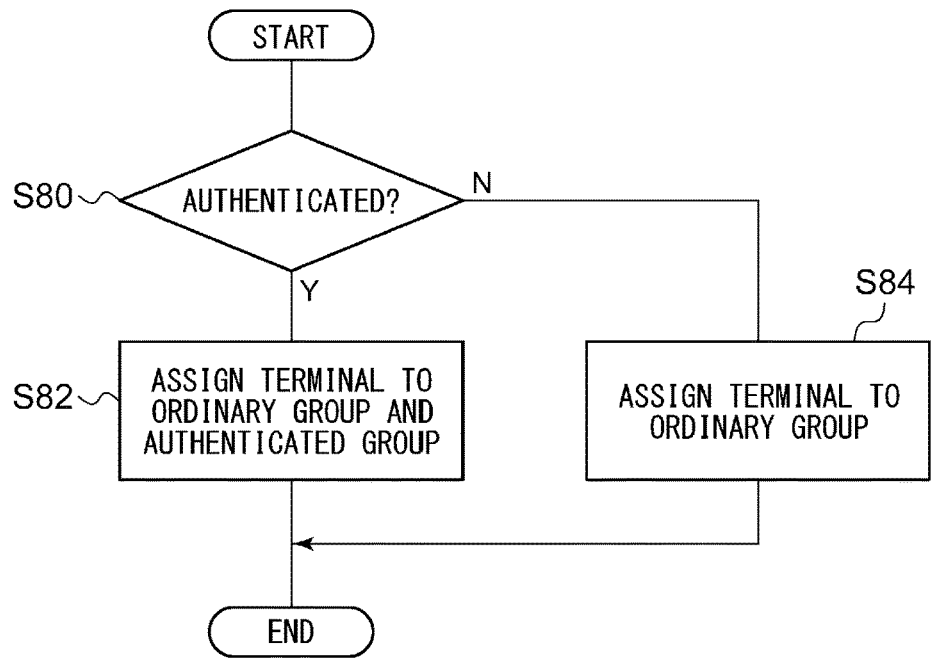
FIG. 17 is a flowchart showing the steps of categorization performed by the management device of FIG. 3.

FIG. 17 is a flowchart showing the steps of categorization performed by the management device 20. If the terminal device 12 is authenticated (Y in S80), the first management unit 66 assigns the terminal device 12 to the ordinary group, and the second management unit 68 assigns the terminal device 12 to the authenticated group (S82). If the terminal device 12 is not authenticated (N in S80), the first management unit 66 assigns the terminal device 12 to the ordinary group (S84).

Figure 18:
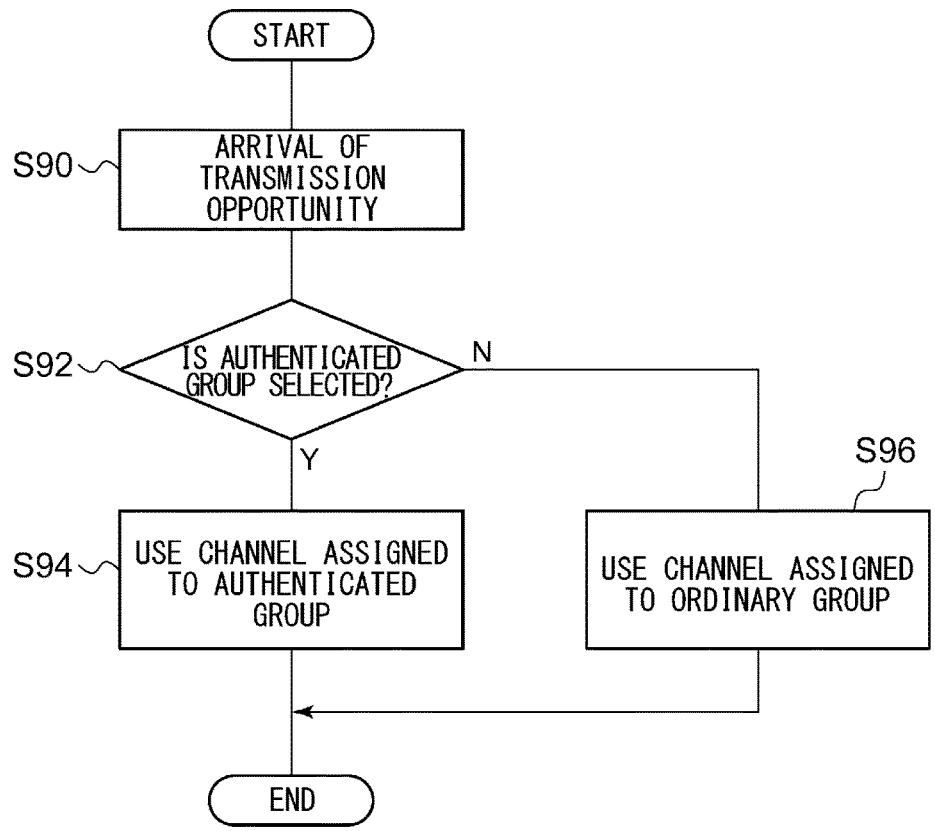
FIG. 18 is a flowchart showing the steps of transmission performed by the terminal device of FIG. 8.

FIG. 18 is a flowchart showing the steps of transmission performed by the terminal device 12. When an opportunity for transmission arrives (S90) and the selection unit 82 selects the authenticated group (Y in S92), the transmission unit 54 uses the channel assigned to the authenticated group (S94). Meanwhile, if the selection unit 82 does not select the authenticated group (N in S92), the transmission unit 54 uses the channel assigned to the ordinary group (S96).

According to the embodiment, the group including only authenticated terminal devices is automatically formed so that the safety of communication is improved merely by selecting that group. Further, the basic functions of the terminal devices can be used without completing personal authentication so that the usability for the user can be secured when the user wishes to save the job required for personal authentication or in an emergency. It is easy to switch between groups so that the usability for the user is further improved. The information on the situation of authentication of terminal devices included in the group is received in response to the transmission of the information on the authentication result. Therefore, the user can know the situation of authentication in the ordinary group when a phone call is made in the ordinary group. Since the situation of authentication in the group is displayed, the user can know the situation of authentication easily and make a phone call (selection of a topic, etc.) depending on the situation of authentication.

Further, users participating in communication are made known so that the user can change the content of communication depending on the user. Since a configuration dedicated to each user is set in a terminal device, one terminal device can be shared by a plurality of users. Since a terminal device is shared by a plurality of users, the number of terminal devices can be reduced. Since the number of terminal devices is reduced, the operation cost is reduced. Since user authentication is performed when the user uses the terminal device and the result is shared by the users on the system, the safety of communication can be secured.

The configuration information in the terminal device is switched according to the user authentication so that the user can use any terminal device configured for the user. Since the user can use any terminal device configured for the user, the usability can be improved in an operation environment in which a large number of terminal devices coexist. By entering a password (or a personal identification number) in a terminal device, the terminal device can be used as a terminal device dedicated to the user, and other users on the system can be notified that the user logged in.

(Embodiment 2) A description will now be given of Embodiment 2. Like Embodiment 1, Embodiment 2 relates to a business wireless system that includes a management device. In Embodiment 1, an authenticated terminal device belongs to an authenticated group as well as to an ordinary group. Therefore, the authenticated terminal device can transmit a signal to other authenticated terminal devices by selecting the authenticated group and can also transmit a signal to other unauthenticated terminal devices by selecting the ordinary group. Embodiment 2 is directed to the purpose of improving the safety of communication further. If the authenticated terminal device selects the authenticated group in Embodiment 2, the selecting terminal device leaves the ordinary group. Consequently, communication between the selecting terminal device and the other unauthenticated terminal devices cannot take place. The business wireless system 100, the management device 20, and the terminal device 12 according to Embodiment 2 are of the same type as those of FIGS. 1, 3, and 8. A description will be given here of a difference from Embodiment 1.

Referring to FIG. 3, the reception unit 62 is connected to the network 14 and receives information on authentication (a request for authentication or an authentication result) from the terminal device 12 via the base station device 10. If the reception unit 62 receives a request for authentication, the authentication processing unit 64 determines whether a match with authentication request data such as a password is found in the master data stored in the storage unit 36, and stores a result of determination (an authentication result) in the database in the storage unit 36. If the authentication result is received, the processing unit 32 receives the information on the authentication result from the reception unit 62 and stores the authentication result in the database in the storage unit 36. Subsequently, the reception unit 62 receives a notification of group selection from the terminal device 12. The notification reflects the selection made in the selection unit 82 of the terminal device 12. If the terminal device 12 is authenticated, the information indicates an ordinary group or an authenticated group. If the terminal device 12 is not authenticated, the notification may not be sent from the terminal device 12.

If the notification indicates an ordinary group, the first management unit 66 manages the terminal device 12 as belonging to the ordinary group. If the notification indicates an authenticate group, the first management unit 66 does not include the terminal device 12 in the ordinary group. If the notification indicates an authenticated group, the second management unit 68 manages the terminal device 12 belonging to the authenticate group. Further, if the notification indicates an ordinary group, the second management unit 68 does not include the terminal device 12 in the authenticated group.

Figures 19, 20:
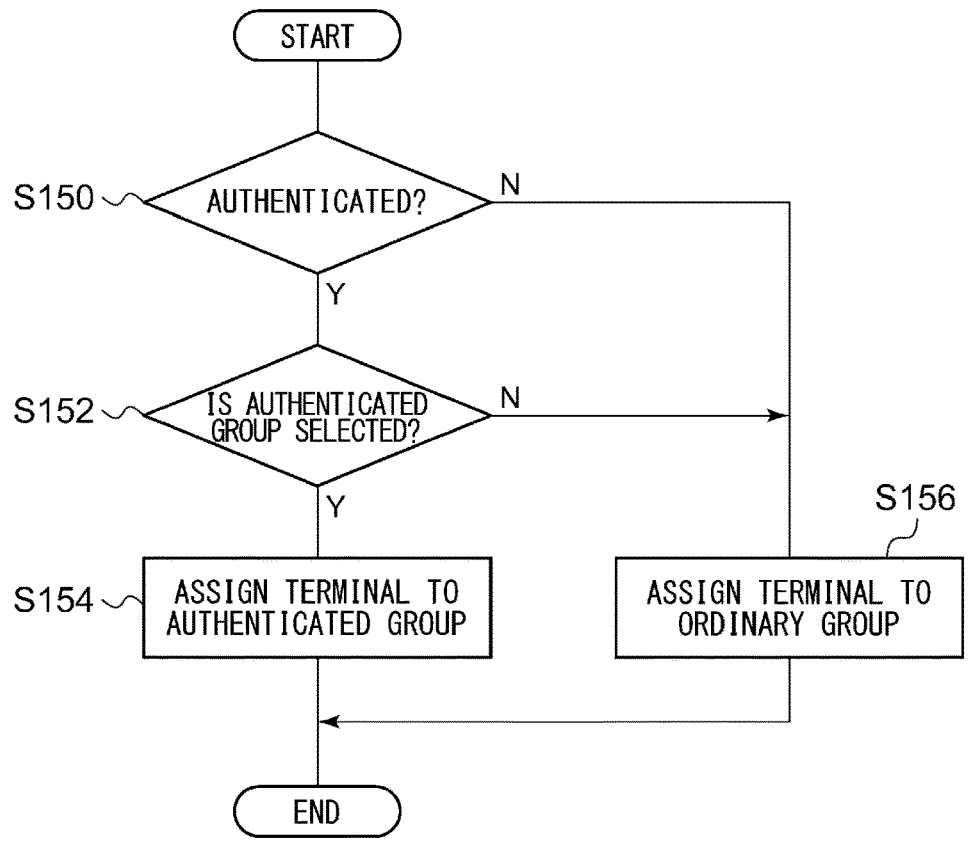
FIG. 19 shows a data structure of a database stored in the storage unit according to Embodiment 2.
FIG. 20 is a flowchart showing the steps of categorization performed by the management device according to Embodiment 2.

FIG. 19 shows a data structure of a database stored in the storage unit 36 according to Embodiment 2. FIG. 19 shows a data structure similar to that of FIG. 4A and "group name," "terminal device ID," and "authentication result" are included. In a given group name field, only one of "1," etc. and "1'," etc. is recorded, "1," etc. being a group name of an ordinary group and "1'," etc. being a group name of an authenticated group. As in the case of FIG. 4B, the table may additionally store "user name."

A description will be given below of a case in which the authentication process is completed in the authentication processing unit 80. The description relates to a process in the authenticated terminal device 12. Referring to FIG. 8, the user uses the operation unit 48 to select either an authenticated group that only authenticated terminal devices 12 can subscribe to or the first group that any terminal device 12 can subscribe to. Selection may be made appropriately even after communication is started. The selection unit 82 acquires the selection result and selects an authenticated group or an ordinary group depending on the selection result. If an authenticated group is selected, for example, an uplink channel and a downlink channel for the authenticated group are assigned. If an ordinary group is selected, an uplink channel and a downlink channel for the ordinary group are assigned.

A description will be given here of a case where the selected group is an authenticated group. The transmission unit 54 uses the uplink channel assigned by the base station device 10 to the authenticated group for transmission. The reception unit 56 in the other terminal devices 12 included in the authentication group uses the downlink channel assigned by the base station device 10 to the authenticated group for reception. Meanwhile, the reception unit 56 in the other terminal devices included only in the ordinary group cannot use the downlink channel assigned by the base station device 10 to the authenticated group for reception and so do not receive a signal.

A description will now be given of a case where the selected group is an ordinary group. The transmission unit 54 uses the uplink channel assigned by the base station device 10 to the ordinary group for transmission. The reception unit 56 in the other terminal devices 12 included in the ordinary group use the downlink channel assigned by the base station device 10 to the ordinary group for reception. Meanwhile, the reception unit 56 uses the channel assigned by the base station device 10 to the authenticated group for reception if the authenticated group is selected, and uses the channel assigned by the base station device 10 to the ordinary group if the ordinary group is selected.

FIG. 20 is a flowchart showing the steps of categorization performed by the management device 20 according to Embodiment 2. If the terminal device 12 is authenticated (Y in S150) and the authenticated group is selected (Y in S152), the second management unit 68 assigns the terminal device 12 to the authenticated group (S154). If the terminal device 12 is not authenticated (N in S150) or if the authenticated group is not selected (N in S152), the first management unit 66 assigns the terminal device 12 to the ordinary group (S156).

According to the embodiment, the terminal device is included only in one of an authenticated group and an ordinary group so that the safety of communication is further improved. An authenticated group or an ordinary group is selected as appropriate so that the convenience for the user is secured.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In Embodiments 1 and 2, the terminal device 12 included in the ordinary group makes a phone call with another terminal device 12 regardless of whether the other terminal device 12 in communication is authenticated or not. Alternatively, the processing unit 42 may change the strength of the encryption used for a phone call depending on whether the other terminal device 12 is authenticated or not. Still alternatively, the processing unit 42 may impose restrictions on incoming calls. For example, the processing unit 42 may prohibit calls incoming from other unauthenticated terminal devices 12 from being accepted. Still alternatively, the processing unit 42 may impose restrictions on origination of calls. For example, the processing unit 42 prohibits calls to other unauthenticated terminal devices 12 from being originated. Still alternatively, the terminal device 12 may light or blink a light emitting diode (LED) for an alert when the user's terminal device 12 is making a phone call with another unauthenticated terminal device 12. According to this variation, the safety of communication is improved even in the ordinary group.

In Embodiments 1 and 2, the terminal device 12 notifies the user of the situation of authentication by using the display unit 50. Alternatively, the user may be notified by synthesized sound or by outputting the situation of authentication to an external device such as a headset and an external display device. Still alternatively, the terminal device 12 may be provided with a notification unit for outputting the situation of authentication to be communicated to the user.

According to Embodiments 1 and 2, the management device 20 is connected to the network 14. Alternatively, however, the management device 20 may be built in one of the base station devices 10. According to this variation, the flexibility of the configuration is improved.

In Embodiments 1 and 2, the terminal device 12 is a wireless communication terminal. Alternatively, however, the terminal device 12 may be a wired communication terminal. In this case, the business wireless system 100 is formed by a wireless network. According to this variation, the flexibility of design of the business wireless system 100 is improved.

What is claimed is:

1. A terminal device used in a communication system where a group including a plurality of terminal devices is formed and communication is performed by using at least one base station device to assign a channel to each group, the terminal device comprising:
   an authentication processing unit that performs an authentication process for authenticating a user using the terminal device when a predetermined user operation is performed;

a reception unit that receives information on a situation of authentication of a plurality of terminal devices belonging to an ordinary group from the base station device,
wherein the terminal device belongs to the ordinary group, and
wherein both a terminal device for which user authentication is completed and a terminal device for which user authentication is not completed being allowed to subscribe to the ordinary group;
a selection unit that selects at least one of:
(i) only the ordinary group, the ordinary group being selected when the authentication processing unit has not completed an authentication process for authenticating a user using the terminal device, or
(ii) one of an authenticated group, formed only by terminal devices for which an authentication process for authenticating a user is completed in the authentication processing unit, and the ordinary group, as a destination of transmission; and
a transmission unit that transmits data via a channel assigned by the base station device to terminal devices belonging to the group selected by the selection unit.

2. The terminal device according to claim 1, wherein:
when the ordinary group is selected in the selection unit, the reception unit uses the channel assigned by the base station device to the ordinary group for reception, and
when the authenticated group is selected in the selection unit, the reception unit uses the channel assigned by the base station device to the authenticated group for reception.

3. The terminal device according to claim 1, further comprising:
a notification unit that outputs information related to the ordinary group and the authenticated group selectable in the selection unit.

4. A non-transitory computer-readable recording medium having embedded thereon a program for a terminal device used in a communication system where a group including a plurality of terminal devices is formed and communication is performed by using at least one base station device to assign a channel to each group, the communication being performed from a terminal device included in a group to which a channel is assigned to another terminal device included in the group, the program comprising:
performing an authentication process when a predetermined user operation is performed;
receiving information on a situation of authentication of a plurality of terminal devices belonging to an ordinary group from the base station device,
wherein the terminal device belongs to the ordinary group, and
wherein both a terminal device for which user authentication is completed and a terminal device for which user authentication is not completed being allowed to subscribe to the ordinary group;
selecting:
only the ordinary group when an authentication process for authenticating a user using the terminal device has not been completed, or
one of two groups of different categories including:
an authenticated group, formed, of the plurality of terminal devices belonging to the ordinary group, only by terminal devices for which an authentication process for authenticating a user is completed, and
the ordinary group; and
transmitting data via a channel assigned by the base station device to terminal devices belonging to the selected group.

* * * * *